United States Patent

[11] 3,614,590

[72] Inventor Andress Kernick
 Lima, Ohio
[21] Appl. No. 825,807
[22] Filed May 19, 1969
[45] Patented Oct. 19, 1971
[73] Assignee Westinghouse Electric Corporation
 Pittsburgh, Pa.

[54] PROGRAMMED WAVEFORM STATIC INVERTER FOR DIGITALLY GENERATING AC WAVEFORMS COMPRISED OF A PATTERN OF EQUAL WIDTH VOLTAGE PULSES
 25 Claims, 8 Drawing Figs.

[52] U.S. Cl. .................................................... 321/9,
 321/5, 321/14, 321/18
[51] Int. Cl. .................................................... H02m 1/12,
 H02m 7/52, H02h 7/14
[50] Field of Search ........................................... 321/5, 9, 9
 A, 18, 45, 19, 14

[56] References Cited
UNITED STATES PATENTS

| | | | |
|---|---|---|---|
| 3,324,376 | 6/1967 | Hunt | 321/9 |
| 3,376,490 | 4/1968 | Osugi | 321/9 X |
| 3,443,196 | 5/1969 | Horner | 321/9 X |
| 3,487,289 | 12/1969 | McMurray | 321/45 |

OTHER REFERENCES
Electronics World " Efficient Inverter," Vol. 80, No. 6, p. 68, Dec. 1968 Beha, Jr.; William H.

*Primary Examiner*—William H. Beha, Jr.
*Attorneys*—F. H. Henson, C. F Renz and M. P. Lynch

ABSTRACT: The invention comprises a solid-state static inverter utilizing digital means for generating AC waveforms comprising a pulse-width modulated pattern of a plurality of picket pulses, wherein each picket pulse of a waveform is defined within an identical number of equal increments of the waveform half cycle.

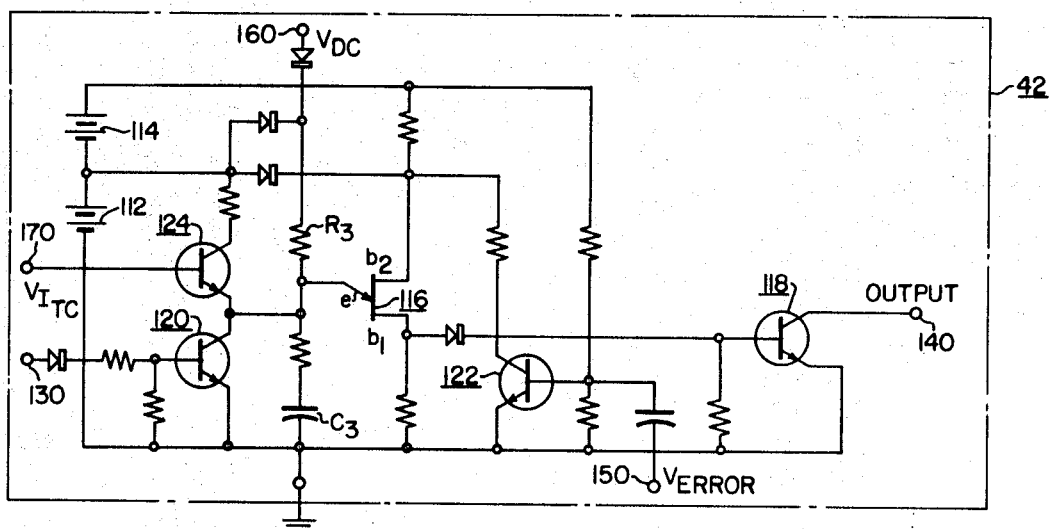
FIG. 3.
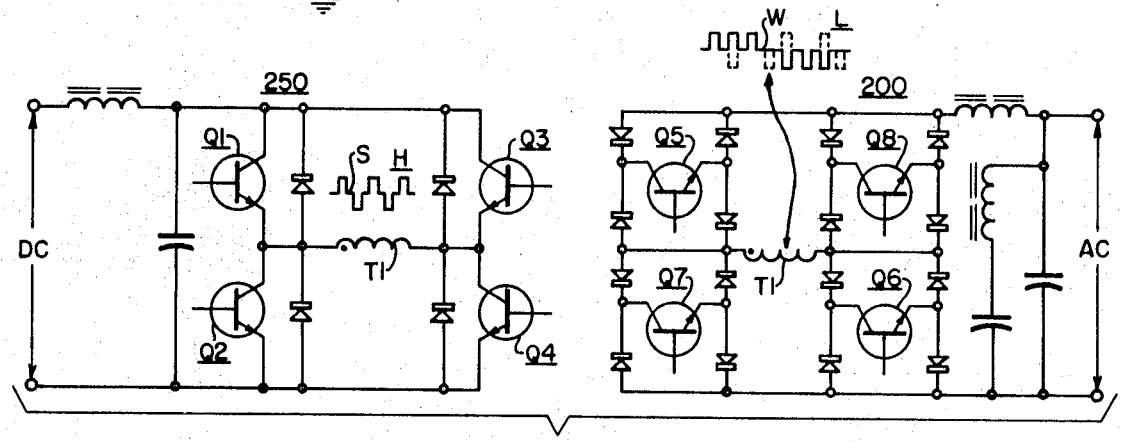
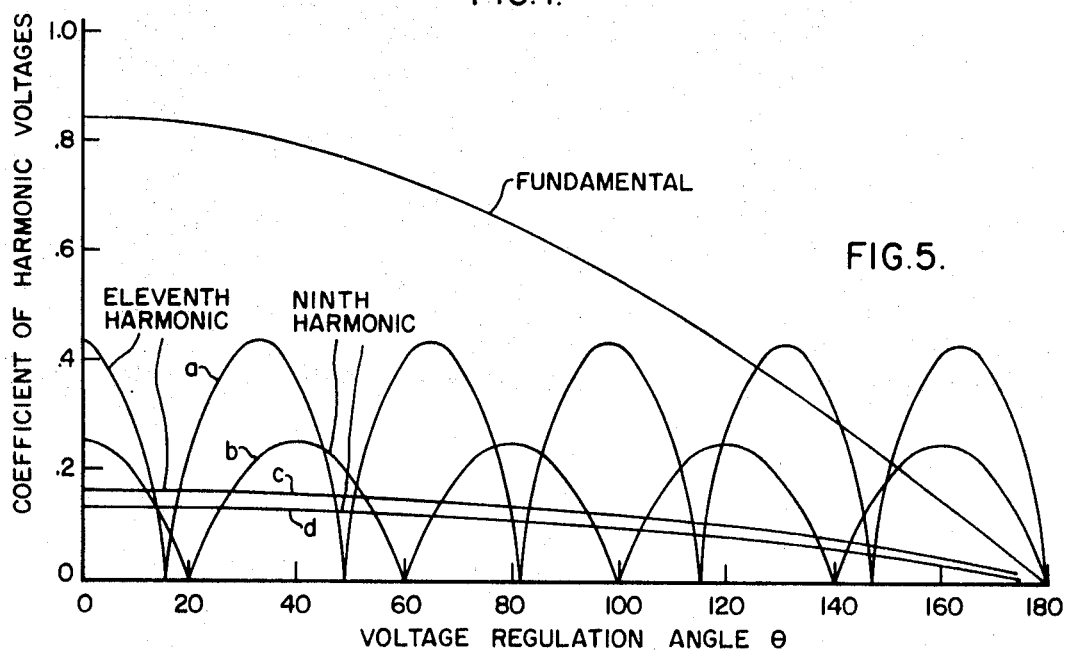
FIG. 7.
FIG. 5.

FIG. 4.

| TYPE | PROGRAMMED WAVEFORM (W=1) | PICKET-WIDTH MODULATED (FULL PkWd=1) | $W = \frac{180°}{n}$ | FULL PkWd | HARMONICS (% FUND) |
|---|---|---|---|---|---|
| A | m=1.10 | | 60° (n=3) | 60° | 3(0) 5(20) 7(14.3) 9(0) 11(9.1) |
| B | m=1.06 | | 2.5° (n=72) | 17.5° | 3(0) 5(0) 7(25.7) 9(38.5) 11(27.2) 13(8.6) |
| C | m=1.11 | | 12° (n=15) | 12° | 3(0) 5(0) 7(11.8) 9(0) 11(24) 13(22.7) |
| D | m=1.07 | | 1.818° (n=99) | 14.54° | 3(0) 5(0) 7(0) 9(17.4) 11(20.6) 13(5.1) 15(22.9) |
| E | m=1.04 | | 5.454° (n=33) | 5.454° | 3(0) 5(1.3) 7(0) 9(0) 11(19.3) 13(25.8) |
| F | m=1.02 | | 2.857° (n=63) | 2.857° | 3(1.8) 5(0) 7(0) 9(7.1) 11(4.1) 13(13.3) 15(1.4) 17(0) 19(19) |

FIG. 6.

| TWO-BRIDGE ADDITIVE COMBINATION | $W = \frac{180°}{n}$ | FULL PkWd | HARMONICS (% FUND) |
|---|---|---|---|
| m=1.09 / TYPE C / TYPE C | 12° (n=15) | 12° | 3(0) 5(0) 7(0) 9(0) 11(16.5) 13(22) 15(0) 17(16.9) 19(9) 21(0) 23(0) 25(0) |

PROGRAMMED WAVEFORM STATIC INVERTER FOR DIGITALLY GENERATING AC WAVEFORMS COMPRISED OF A PATTERN OF EQUAL WIDTH VOLTAGE PULSES

BACKGROUND OF THE INVENTION

1. Field of the Invention

The present invention refers to an arrangement for the conversion of DC voltage into a sinusoidal AC voltage waveform of the type comprising a switching network and digital means for developing a picket pulse pattern for actuating the switching network to generate the desired sinusoidal waveform.

2. Description of the Prior Art

The size and weight of conventional power conditioning equipment present serious problems to the design of power inverters to meet the stringent specifications presented by aerospace applications, where space and weight are at a premium while power loads are continually increasing. Inversion is usually mandatory in space vehicles where self-contained DC power sources like solar cells, thermionic diodes, and fuel cells must ultimately drive AC loads.

Advances in solid-state power-switching devices and integrated circuits have permitted a substantial reduction in the number of inverter components required and the size and weight of transformers and filters for inverter circuits. A circuit concept recently introduced by the assignee of the present invention, known as staggered phase-carrier cancellation (SPCC) utilizes fast-switching power transistors in an inverter bridge circuit to produce high-quality sinusoidal output voltage waveforms with a minimum of filtering. This technique (SPCC) combines pulse-width modulated waveforms having the same low-frequency modulation but different carrier phases to synthesize a desired waveform.

The switching devices are operated in nonsaturating states to reduce output voltage waveform distortion exhibited by conventional inverter systems incorporating storage switching components. The operation of the switching devices in the saturated mode can result in loss of narrow pulses, however, which introduces considerable distortion in the output waveform.

Furthermore the independent modulation of the waveform pulses for the purpose of voltage regulation increases the tendency towards narrow pulses which makes avoidance of undesirable harmonic distortion in the output waveform more difficult. Neutralization or cancellation of selective harmonics in inverter circuits operating with wide, fixed pulse widths is generally accomplished by initiating the switching of the bridge elements of the inverter circuit at prescribed electrical angles or degrees of the waveform.

Voltage regulation in the conventional full bridge inverter has been generally accomplished by phase shifting two half bridges, each of which are operating on a similar switching schedule, thereby providing cancellation of selected low-order harmonics. While this method of voltage regulation has been successful in neutralizing the lowest order harmonics, there remain relative-low-order unneutralized harmonics, such as the ninth and eleventh which experience modulation during voltage regulation which results in variable waveform distortion. Attempts to attenuate such harmonic modulation by passive filter elements are impractical and expensive.

SUMMARY OF THE INVENTION

With the advent of high power, fast-switching power transistors and reliable integrated circuit logic elements, a new mode of operation has been developed for the full bridge inverter circuits which permits switching devices such as power transistors to turn on fully to the saturated state without distortion of the AC output resulting.

Solid-state logic circuits subdivide a time interval equal to, although not necessarily coincidental therewith, one-half cycle of the fundamental of the desired sinusoidal waveform output into an integral number of equal increments. The switching signal of the solid-state devices incorporated in the inverter bridge is controlled digitally.

Programmed logic means develop pulse and space sequence patterns comprising of an array of picket voltage pulses of uniform width interspersed occasionally by spaces which may not be of uniform width all produced relative to the integral number of equal increments. The sinusoidal waveform information is developed digitally with cancelled low-order harmonics thus eliminating the requirement for a sine wave oscillator. The integral number is generally divisible by 3 thus enabling the formation of three-phase sine wave arrays by digital means.

Picket pulse-width control means are provided to uniformly adjust the width of each picket voltage pulse in a pulse pattern to provide output voltage regulation and limitation of current flow through the bridge switching elements.

The novel mode of inverter operation, whereby each picket voltage pulse width is uniformly modulated, maintains the centroids of the picket pulses in a predetermined relationship thus avoiding undesired low-order harmonic modulation so that peak sensitive AC loads, such as transformer-rectifiers, are presented with an output voltage waveform of essentially constant crest factor.

It is an object of this invention therefore to generate sinusoidal inverter output waveforms by digitally dividing a time interval equal to the half period of a desired sinusoidal waveform into an equal number of increments and logically developing a sequence of distributed spaces and picket voltage pulses of uniform width whose boundaries at maximum output voltage lie on graduations established by the integral number of equal increments.

It is a further object of this invention to provide means for controlling picket-width modulation of each picket pulse in the half-cycle pattern on a transient basis while maintaining a predetermined space relationship between the centroids of the picket pulses and thereby minimizing harmonic distortion.

Another object of this invention is to extend the teachings of picket-width modulation to an inverter circuit that combines two or more bridge circuits.

Another object of this invention is to extend the teachings of picket-width modulation to inverter circuits utilizing a synchronous demodulator circuit.

Still another object of the invention is to provide a plurality of single-phase static inverters in a polyphase inverter system.

DESCRIPTION OF THE DRAWINGS

FIG. 3 is a detailed schematic of the block of FIG. 2 identified as picket pulse-width control circuit;

FIG. 4 is a tabulation of programmed waveforms corresponding to a single-phase inverter circuit;

FIG. 5 is a graph illustrating control of harmonic modulation provided by the invention;

FIG. 6 is a tabulation of a programmed waveform produced by an embodiment of the invention utilizing dual bridge circuits;

FIG. 7 is a partial schematic of a bridge circuit of the invention including a synchronous demodulator circuit.

DESCRIPTION OF PREFERRED EMBODIMENTS

Figure 1:
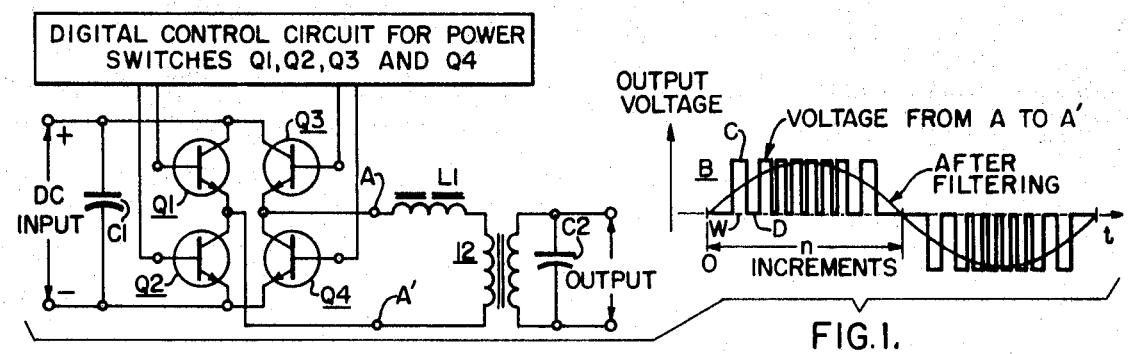
FIG. 1 is a basic diagram of a full bridge inverter circuit with a digital circuit for establishing the switching sequence of the bridge elements.

Referring to FIG. 1 there is illustrated a full bridge inverter circuit 10 comprising power switches $Q_1$, $Q_2$, $Q_3$ having a DC voltage source (not shown) at the input of the bridge and an AC transformer 12 connected across the output of the bridge 10.

A digital control circuit 2 controls the conduction sequence and intervals of the power switches $Q_1$–$Q_4$ to provide a square wave pulse pattern illustrated in the waveform as the voltage from points A to A' of the circuit. The filtering operation of inductor $L_1$ and capacitor $C_2$ results in an AC waveform output from transformer 12 which is represented by the dashed waveform.

The digital control circuit 2 develops half-period programmed waveforms which are equal to the half cycle of the desired output waveform but do not necessarily coincide with the half cycle of the AC output waveform.

The programmed pulse pattern B is identical for each half cycle of the waveform thus resulting in the generation of substantially synchronous AC waveforms in that each half cycle of the AC waveform is substantially identical. The half-period programmed waveform of a desired AC waveform is subdivided into "$n$" substantially equal increments resulting in half-period intervals $w$ wherein each $w$ of a selected programmed waveform is defined in electrical degrees as $w=180°/n$.

Picket voltage pulses C of uniform width are developed in a pattern B coincidental with and as a multiple of the $w$ intervals. Selected voids D are provided in the programmed picket pulse waveform to generate the desired AC output waveform.

The maximum picket width corresponds to a single $w$ pulse or a multiple of $w$ pulses. The digital control circuit 2 provides the capability of adjusting the width of each picket pulse to a width less than the maximum value.

Figure 2:
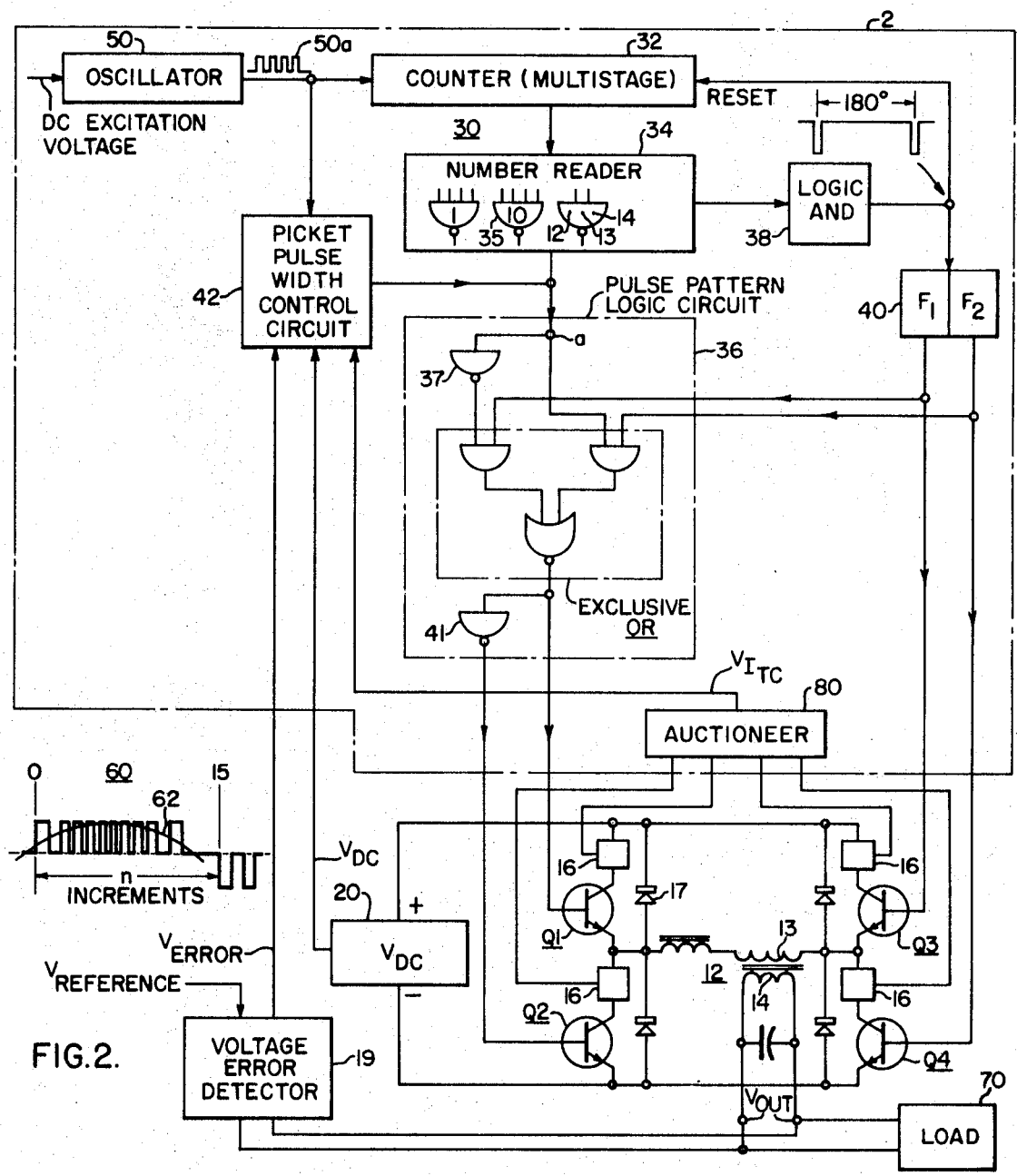
FIG. 2 is a block schematic diagram of a preferred embodiment of the circuit of FIG. 1.

Referring to FIG. 2 there is illustrated according to FIG. 1 a single phase, full bridge inverter circuit 10, comprising solid-state switching elements $Q_1$, $Q_2$, $Q_3$ and $Q_4$, and a DC voltage source 20 connected across the bridge circuit 10. The digital control circuit 2 of FIG. 1 is represented as a digital control circuit 30 driven by a clock oscillator 50 developing a picket pulse pattern 60 for gating the switching elements $Q_1$ and $Q_2$ of bridge circuit 10 in such a manner as to generate a desired programmed waveform voltage 62 across the series combination of choke 15 and transformer 12 for application to a load 70.

Each of the switching devices $Q_1$, $Q_2$, $Q_3$ and $Q_4$, which are represented as power transistors, is gated ON for an incremental period of time determined by the picket pulse pattern 60 developed by the control circuit 30. The switching devices $Q_1$–$Q_4$ in bridge circuit 10 are arranged in series pairs $Q_1$ and $Q_2$, $Q_3$ and $Q_4$ such that within each half cycle of the output waveform as determined by the control circuit 30 only one transistor in the pair of switching elements $Q_3$ and $Q_4$ is capable of conducting. Switching devices $Q_1$ and $Q_2$ are never simultaneously conducting or cut off, nor are switching devices $Q_3$ and $Q_4$ simultaneously conducting or cut off.

The control circuit 30 includes a multistage counter 32, which for the purpose of discussion is assumed to be of the binary type. The counter 32 is incremented by the clock oscillator output pulses 50a, the pulse per second rate of the oscillator 50 is $2n$ times the desired fundamental frequency of the AC output, where $n$ equals the number of equal increments into which each half period is divided.

A number reader 34 logically responds to the output condition of each of the binary stages of the counter 32 to determine picket pulse pattern devoid of pickets in conjunction with the picket pulse pattern logic circuit 36. Each picket pulse maximum width consists of one or more $w$ pulses, the number of $w$ pulses per picket being a function of the waveform program as illustrated in FIG. 4. The number of $w$ pulses per picket pulse of a specific waveform is identical. The picket pulse pattern typically corresponds to a predetermined number pattern programmed into the number reader 34 so that a sinusoid devoid of low-order harmonics is approached. Typically the number reader 34 may include multiple input logic NAND gates 35 which selectively block the passage of specific $w$ pulses thereby rendering selected intervals devoid of pickets in accordance with the programmed picket pulse pattern. The programmed number pattern is developed on a time interval equal to a half period of a fundamental frequency which is graduated in $w$ increments. This graduated time interval does not necessarily coincide with the half-period interval for all waveform programs. The programmed number pattern established in a number reader 34 is dictated by the desired sinusoidal output waveform as explained hereafter in reference to the programmed waveform tabulation appearing in FIG. 4.

The clock oscillator pulses 50a which increment the binary counter 32 divide a time interval equal to a half cycle of the desired sinusoidal waveform into an integral number of substantially equal increments, $n$, which through the selective gating operation of the number reader 34 result in a half-cycle pulse pattern.

A reset pulse is initiated by a single-pulse-generating logic AND gate 38 in response to a number reader 34 condition representing a number value equal to the $n$ count which corresponds to completion of alternate half cycles of the programmed sinusoidal waveform. The reset output of the pulse generator 38 resets the counter 32 to zero in preparation for the subsequent waveform half cycle, as well as setting a flip-flop circuit 40 into an alternate stable condition. The flip-flop circuit 40, in addition to controlling the picket pulse pattern as will be explained later, functions to synchronize the conduction of alternate diagonals of the bridge inverter circuit 10 with alternate half cycles of the sinusoidal output waveform $V_{out}$.

The frequency of the flip-flop switching and consequently the frequency of the sinusoidal inverter waveform $V_{out}$ is determined by the pulse rate of the clock oscillator 50.

For the purpose of describing the operation of the control circuit 30, it is assumed that the waveform information programmed into number reader 34 corresponds to the waveform C of FIG. 4. It is apparent from FIG. 4 that each picket pulse of waveform C corresponds to a single $w$ pulse. The number of time increments, $w$, per half period of waveform C is 15, thereby resulting in a $w$ pulse width (and in this instance a picket pulse width) equal to 180 divided by $n$, or 12 electrical degrees. The selected waveform for a specific application will be determined by the required inverter performance specifications and the availability of power switches for the inverter bridge 10 needed to execute a selected degree of sophistication in waveform programming.

The NAND gates 35 of the number reader 34 respond to the sequential count of 15 on counter 32 by gating pulse pattern spaces during $w$ increments 1, 10, 12, 13 and 14.

The pulse pattern 60 of FIG. 1 represents waveform type C of FIG. 3.

The waveform C program has been shifted with respect to the half cycle of the AC output in order to group the voids or pattern spaces 12, 13 and 14 to enable the use of a single NAND element to provide the corresponding pattern spaces. This illustrates a program waveform half period which does not coincide with the AC waveform half cycle.

The programmed pattern for spaces is generated by the number reader 34 when acting in concert with the picket pulse logic circuit 36 which functions as an exclusive OR (logic device). Exclusive OR circuits such as Amelco semiconductor Type 341 are commercially available. The logic elements 37 and 41 are logic NANDs which function as logic inverters at the input and output respectively of the exclusive OR circuit 36.

Logic circuit 36 follows flip-flop circuit 40 in its output to command switching devices $Q_1$ and $Q_4$, or $Q_2$ and $Q_3$ to turn on simultaneously to produce a square wave on the inverter bridge 10 in the absence of a space command signal from either the number reader 34 or the picket pulse-width control circuit 42. The exclusive OR action of logic circuit 36 causes $Q_1$ to become synchronized with $Q_3$ and $Q_2$ to become synchronized with $Q_4$ in the presence of a space command signal.

The output condition of the logic NANDs 35 of the number reader 34 during gating of pulses is a logic 1 whereas during the blocking of pulses, or gating of spaces, the output of the NANDs 35 are a logic 0.

The operation of the picket pulse pattern logic circuit 36 can be logically defined as follows:

|  | Logic ONE from point "a" at FIG. 2 | | | | Logic ZERO from point "a" of FIG. 2 | | | |
| --- | --- | --- | --- | --- | --- | --- | --- | --- |
|  | $F_1$ | $Q_1$ | $F_2$ | $Q_2$ | $F_1$ | $Q_1$ | $F_2$ | $Q_2$ |
| 1st half period | 0 | 1 | 1 | 0 | 0 | 0 | 1 | 1 |
| 2nd half period | 1 | 0 | 0 | 1 | 1 | 1 | 0 | 0 |

This logic table functionally describes the operation of logic of circuit 36, such that a logic 1 condition is established at the gate terminal of either switching device $Q_3$ or $Q_4$, as determined by the condition of flip-flop circuit 40. A reversal of 0's and 1's is established at the respective $Q_3$ and $Q_4$ gate terminals during all other half-cycle intervals. The condition of flip-flop circuit 40 for alternating half cycles of the sinusoidal waveform establishes picket pulse conduction through the bridge diagonals $Q_1$ and $Q_4$, and $Q_2$ and $Q_3$ alternatively. The current from the DC voltage source 20 flows through the switching device $Q_1$, transformer primary winding 13 and switching device $Q_4$ when a logic 1 condition exists at number reader 34, picket pulse-width control circuit 42 and the flip-flop stage $F_2$.

A logic 0 from either number reader 34 or picket pulse-width control circuit 42 initiates the exclusive OR function in pulse pattern circuit 36 so that spaces are produced in the pulse pattern 60 and the voltage induced in the transformer secondary winding 14 in order to approximate a sine wave 62. When the flip-flop is reset establishing a logic 1 at the flip-flop stage $F_1$ then the bridge diagonal comprising $Q_1$ and $Q_4$ is rendered nonconductive and the bridge diagonal comprising $Q_2$ and $Q_3$ is rendered conductive in response to picket pulses of the gate terminal of switching device $Q_2$. In this latter condition of flip-flop circuit 40, current will flow through the switching device $Q_3$, primary transformer winding 13, and switching device $Q_2$ in a direction through winding 13 opposite to that exhibited in the former condition of flip-flop circuit 40. The voltage across winding 14 will approximate a half-cycle sinusoidal waveform of opposite polarity to that exhibited during the conduction through switching devices $Q_1$ and $Q_4$.

The sinusoidal output voltage, $V_{out}$, is therefore comprised of identical half-cycle picket pulse patterns wherein each picket pulse is of substantially the same width.

A picket pulse-width control circuit 42 responds to the inputs representing the sinusoidal output voltage $V_{out}$ and the DC bridge inverter supply $V_{DC}$ to modify the width of each picket pulse in the picket pulse pattern to provide output voltage regulation and demodulation of DC input voltage ripple respectively.

Picket pulse-width control is likewise provided to control the output voltage as a means of limiting the magnitude of current flow through the power switching devices $Q_1$, $Q_2$, $Q_3$ and $Q_4$. Current transformers 16 monitor the current flow through each switching device. An auctioneer circuit 80 responds to responds outputs of the current transformers 16 to supply a voltage signal, $V_{ITC}$, indicative at the highest value of current flow through the switching devices to the picket pulse-width control circuit 42.

The picket pulse-width control initiated by circuit 42 in response to any of these inputs may be in the form of well-known techniques such as double-edge or single-edge picket pulse-width modulation.

The centroids of the picket pulses in a programmed waveform pattern are maintained in a substantially set relationship due to the fact that the modulation of picket pulses is continuous and uniform. The picket pulse centroid relationship during uniform pulse modulation shifts the fundamental frequency sine wave a limited amount due to the narrowness of the picket pulse width. The maximum shift is one-half a picket width and this occurs when the magnitude of the waveform approaches 0 due to pulse modulation.

Neutralization of the third, fifth and seventh harmonics can generally be maintained when either single leading or trailing edge, or double-edge pulse modulation is utilized.

Unneutralized harmonics of low order, i.e. ninth and eleventh harmonics, as illustrated in curves $c$ and $d$ in FIG. 5 do not exhibit any significant modulation throughout the regulation of the programmed waveform picket-width voltage control range. The curves $a$ and $b$ illustrate unacceptable modulation of the ninth and 11th harmonics resulting from the regulation of output voltage by the well-known phase-shifting method.

The unneutralized harmonics of higher order, although exhibiting modulation, are not significant since low-pass output filters are suitably effective in attenuating higher order harmonics.

The uniform picket-width mode of operation accommodates nonideal power switch properties such as finite rise time, storage time and finite fall time when these properties are stabilized. This mode of operation substantially eliminates "feathering out" or loss of picket pulses. As a result of the uniform, finite picket pulse widths, the power switches can be operated in a saturated condition thus eliminating harmonic distortion due to loss of pulses. Loss of individually modulated pulses and the resulting waveform distortion is encountered in conventional nonsaturating inverter system where pickets must "feather out."

Since the picket pulse does not "feather out," the new mode of operation tolerates the longer rise and fall times of available power transistors which exhibit large collector current capability but are generally considered to be too slow for use in advanced static inverter circuits.

Suitable means for stabilizing power transistors is described in detail in U.S. Pat. No. 3,305,761 issued Feb. 21, 1967 and assigned to the assignee of the present invention. The use of controlled current feedback transformers as taught by this patent, in connection with the power switch circuits, results in stabilization of power switch storage time so that a constant time delay (typically 5 microseconds) can be absorbed into the waveform program without adverse affects inasmuch as all pickets are subjected to a uniform transport lag.

When stabilized, the nonideal power switch properties are incorporated into the programmed waveform without reconstituting the neutralized harmonics since the relationship of the picket centroids has been maintained.

Referring to FIG. 3 there is illustrated schematically a circuit 110 for implementing the pulse width control operation of the picket pulse-width control circuit 42 of FIG. 2. The pulse-width circuit 110 comprises generally, bias potential sources 112 and 114, unijunction transistor 116, output transistor 118 and control transistors 120, 122 and 124. The bias potential sources 112 and 114 develop maximum and minimum limits for bias potential at the unijunction transistor base terminal $b_2$. The conduction of the unijunction transistor 116 between the base terminals $b_2$ and $b_1$ is a function of the voltage applied to the base terminal $b_2$ and the level of the bias voltage applied to the unijunction transistor emitter terminal $e$. The conduction of unijunction transistor 116 develops a base drive signal for output transistor 118.

In operation the output pulses 50a of oscillator 50 are applied to the pulse-width control circuit input terminal 130. The oscillator pulses 50 are applied to the base of the control transistor 120. This base drive signal controls the conduction of transistor 120. The conduction of transistor 120 in response to oscillator pulses 50a unlatches unijunction transistor 116 at the trailing edge of each picket by diverting current through $R_3$ which is in excess of the valley-current value. The schedule of conduction periods of the unijunction transistor 116 develops a base bias triggering potential at output transistor 118. The duration of the conduction of transistor 118 at terminal 140 determines the zero dwells, or periods in which the circuit 42 exercises limited control of the picket pulses of the programmed waveform. The selection of resistors $R_3$ and capacitor $C_3$ determines the delay periods of the unijunction transistor 116. The charge on capacitor $C_3$ maintains the status of unijunction transistor 116 during oscillator pulses in the absence of external control signals at terminals 150, 160 and 170. In the absence of this control the pulse pattern at point "a" will represent maximum voltage and will appear as the waveform in the column "Programmed Waveform" of FIG. 4.

Manipulation of the conduction of unijunction transistor 116 is provided by input signals $V_{Error}$, $V_{DC}$ and $V_{I_{TC}}$ at circuit terminals 150, 160 and 170 respectively.

An error-detector circuit 19 develops a DC voltage equivalent to the AC output $V_{out}$, compares it to a preset DC signal $V_{ref}$ and generates a DC output $V_{Error}$ in the event $V_{out}$ exceeds prescribed limits.

The $V_{Error}$ signal is applied to the base terminal $b_{122}$ of the control transistor 122 which operates in a class "A" mode. The effect of varying base bias at terminal $b_{122}$ is modulation of unijunction bias potential at the base terminal $b_2$. The modulation of the unijunction base $b_2$ bias potential by transistor 122 in response to $V_{out}$ affords closed loop control of the output voltage, $V_{out}$ by modulating the width of the output pulses of transistor 118.

The effect of variation or ripple in $V_{DC}$ likewise affects the delay of the unijunction transistor 116 and consequently the output of transistor 118 by introducing a variable delay inversely proportional to $V_{DC}$ such that picket pulses of uniform volt-seconds are produced.

The delay of the unijunction transistor 116 as a function of emitter drive potential is further dependent on the bias potential applied to the base terminal $b_{124}$ of control transistor 124 by the output potential $V_{I_{TC}}$ of the auctioneer circuit 80. A bias voltage $V_{I_{TC}}$ of a magnitude indicating excess current flow through any of the power transistor switches $Q_1$, $Q_2$, $Q_3$ or $Q_4$ of the bridge circuit 10 results in conduction of the transistor 124 which in turn immediately terminates the picket pulses at discrete angles to thereby reduce the output voltage $V_{out}$ and the current flow through power transistors $Q_1$, $Q_2$, $Q_3$ and $Q_4$.

The effect of control signals at inputs 150, 160 and 170 is the modulation of the full picket-width waveform illustrated as "Programmed waveform" OF FIG. 4 to the waveform of discrete uniform pulses depicted in "Picket-Width Modulated" of FIG. 4. The circuit of 110 affords trailing edge picket-width modulation as illustrated in FIG. 4 where a full picket-width limit is represented by dotted vertical lines.

The logic NANDs 35 of the number reader 34 and the output transistor 118 of circuit represent passive pullup devices which are only capable of pulldown operation 1 the generation of logic 0's.

The input logic of circuit 36 in conjunction with the output condition of circuits 110 and 34 provide the "pullup" capability which results in the logic 1 content of the programmed waveform.

Numerous single-bridge programmed waveforms and the corresponding picket-width modulated wave patterns are illustrated in FIG. 4. As noted previously the number of uniform increments, $n$, or switching periods in the programmed waveform is dependent on the switching devices selected for the bridge circuit and the operational requirements of the system. The significant harmonics present in the full, unmodulated waveform illustrated in the column "Programmed Waveform" are listed in the column "Harmonics." The number without parenthesis denotes the number of the harmonic while the number within parenthesis denotes the percent magnitude of the associated harmonic relative to the fundamental sine wave magnitude. The neutralized and nearly neutralized harmonics are offset to the left. The $m$ shown in the column "Programmed Waveform" denotes the peak of the fundamental relative to the maximum instantaneous voltage of the programmed waveform. An $m$ of 1.11 for the type C programmed waveform indicates that an apparent modulation index of 111 percent is achieved before any regulation of output voltage.

The modulation index generally equals or exceeds 100 percent in the programmed waveform thus resulting in optimum power switch utilization.

Variations of the basic embodiment disclosed in FIGS. 1 and 2 include the arrangement of three of the single-phase inverter circuits for three-phase applications, utilization of a dual bridge arrangement, and the application of a synchronous demodulator circuit to the output of said bridge circuit(s).

Figure 8:
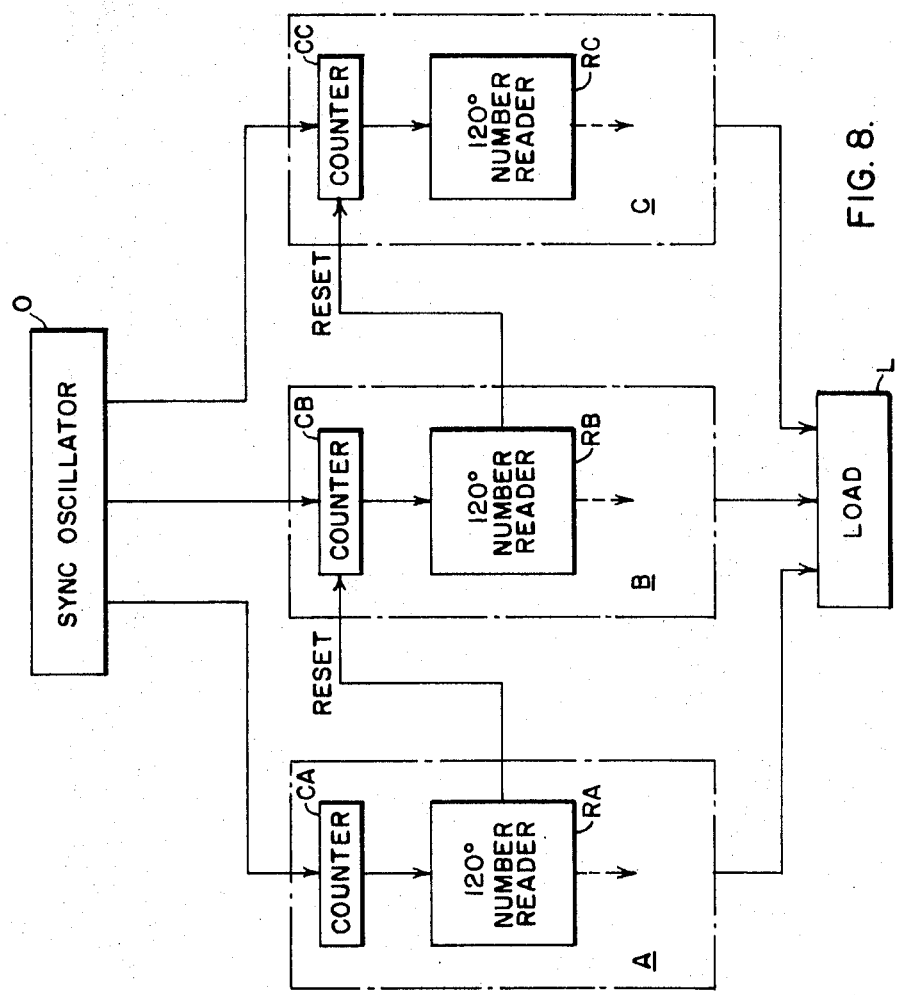
FIG. 8 is a block schematic diagram indicating one technique for utilizing the embodiment of FIG. 2 in a polyphase inverter circuit.

The arrangement of the three independent single-phase inverter circuits in a three-phase array as illustrated in FIG. 8 provides independent control of individual phase voltage regulation while the individual phases are digitally maintained in proper phase relationship. Numerous techniques are available to those skilled in the art for incorporating the digital techniques disclosed with reference to FIG. 2 to implement these digital techniques for polyphase inverter applications. A typical implementation for a three-phase system incorporating the circuit of FIG. 2 for each phase A, B and C of the three-phase system is illustrated in FIG. 8. The counters CA, CB and CC of respective phase circuits A, B and C are driven by a synchronous oscillator 0. The 120° number readers RA and RB provide counter reset pulses to the succeeding counters CB and CC respectively, which function as slave units with respect to master counter CA, to establish the required 120°-phase relationship between the individual phase output voltage developed by the circuits A, B and C which are supplied to the load L. The selection of waveforms exhibiting an $n$ value divisible by 3 simplifies significantly the logic circuit requirements in the three-phase array.

Harmonic neutralization is improved and inverter power rating increased by operatively combining two bridge circuits of the type identified in FIG. 2 as circuit 10. The programmed waveforms of the two bridge circuits are phase shifted in relation to the desired harmonic neutralization and summed either serially or by interphase transformers. The combined waveform based on the summation of two type C waveforms phase shifted 24° is illustrated in FIG. 6. The tabulation of neutralized harmonics of the combined waveform indicates complete neutralization of the third, fifth, seventh and ninth harmonic. This particular waveform combination therefore offers a "first-harmonic-the-11th" waveform. The summation of the programmed waveforms in the dual bridge configuration applies as well to other waveforms including those illustrated in FIG. 4.

In addition to providing improved harmonic neutralization and increased inverter power rating, the two-bridge combination facilitates the use of relatively slow switching power switches, such as germanium devices, which are not acceptable in many of the sophisticated inverter applications. The increased number of pulses provided by the combined bridge arrangement compensates for the relatively large pickets associated with the slower switching devices by providing sufficient control points in the programmed waveform for picket-width modulation.

Still another refinement in the embodiment of FIG. 2 and the above-noted variations is the application of a synchronous demodulator circuit to the output of a high-frequency inverter circuit. The combined effect is similar to that accomplished by the bridge circuit 10 of FIG. 2. A schematic illustration of the synchronous demodulator circuit 200 in operative relationship with a high-frequency bridge circuit 250 is illustrated in FIG. 7. The synchronous demodulator is essentially a synchronously driven, bidirectional, static, two-pole, double-throw reversing switch connected to the secondary winding of the high-frequency transformer $T_1$.

The synchronous demodulator circuit is especially useful in inverter applications requiring a low-frequency output waveform, i.e. 60 Hertz. The synchronous demodulator circuit permits the use of a lightweight, relatively small, high-frequency power transformer in place of the conventional large, low-frequency transformer which would be required for developing a 60-Hertz waveform at the output of the bridge circuit.

The switching elements $Q_1-Q_4$ at the high-frequency bridge 250 respond to control signals comparable to those developed by the digital control circuit 2 and identified functionally as clock oscillator output signals and picket-width control signals. Alternate polarity picket pulses are developed at the high-frequency transformer $T_1$ in a manner illustrated in waveform H.

The synchronous demodulator switching elements $Q_5-Q_8$ respond to control signals comparable to those developed by the digital control circuit 2 which determine the polarity of the picket pulses and the required pulse pattern. The switching action of switching elements $Q_5-Q_8$ results in the inversion of alternate polarity pickets (shown in dotted lines) per half cycle of the output waveform L with allowance for waveform voids m.

The operation of synchronous demodulator circuit 200 in conjunction with the high-frequency bridge 250 permits the generation of a low-frequency waveform L at the secondary of transformer $T_1$ while utilizing a compact high-frequency inverter transformer.

Voltage in the synchronous demodulator is quite high, being typically 180 to 250 volts. There is danger of secondary breakdown in power transistors if they encounter high voltage simultaneously with high-current interruption. Timing between the pulse-width modulated bridge 250 and the synchronous demodulator 200 can be made such that the current transfers in the synchronous demodulator are made at essentially 0 voltage. In order to provide the 0-voltage dwell times, the pulse-width modulated bridge never operates to full pulse width as evidenced by the spaces s of waveform H. During the brief periods when the bridge provides a shorting path for load current, i.e. $Q_6$ and $Q_8$ or $Q_5$ and $Q_7$ are conducting, the synchronous demodulator can have overlap in its bidirectional switches for transfer of current paths at essentially 0 voltage and zero power dissipation. The ideal switching locus provided by the synchronous demodulator eliminates secondary breakdown of the switching devices.

The picket-width modulation is accomplished by the bridge circuit 250 in which the high-frequency power transformer $T_1$ operates at constant volt-seconds. This power transformer, being a simple two-winding configuration, can operate with its magnetic core very near saturation flux density so that the transformer is of minimum size and weight.

In all inverter applications thus described the power transformer isolates the DC power from the AC system while providing a desirable AC link between the inverter bridge circuit and the load.

The rectifiers 17 of FIG. 2 provide protection for the power switches $Q_1-Q_4$ in the event of reverse AC power feed from the load to the bridge.

I claim as my invention:

1. In power inverter apparatus for converting DC voltage to an AC voltage waveform, the combination comprising, means for generating timing pulses corresponding in number to an integral number of substantially equal increments of a period equal to the half cycle of said AC voltage waveform, switching network means being supplied from a DC voltage source and including solid-state switching elements, and means for developing picket voltage pulses in response to said timing pulses, each of said picket pulses being of substantially uniform width and defined within limits of an equal number of said increments, the number of increments in a picket pulse being a function of the selected AC voltage waveform, said picket voltage pulses triggering said solid-state switching elements to provide an AC voltage waveform that is essentially devoid of selected low-order harmonics.

2. In power inverter apparatus as claimed in claim 1 wherein said means for developing picket pulses includes, logic means for selectively eliminating picket pulses to develop a picket pulse pattern corresponding to the desired AC voltage waveform.

3. In power inverter apparatus as claimed in claim 2 wherein said picket pulse pattern developed for each half cycle of the fundamental of the desired AC voltage waveform is identical.

4. In power inverter apparatus as claimed in claim 1 wherein said switching network means includes a power transformer having a primary winding operatively connected with said source of DC voltage and a secondary winding operatively connected to a load.

5. In power inverter apparatus as claimed in claim 4 wherein the transformer provides both DC isolation and AC link between the load circuit and the switching elements.

6. In power inverter apparatus as claimed in claim 4 including a choke connected in the primary of said power transformer and electrical filter means operatively associated with the output of said power transformer to effectively attenuate high-order harmonics of the output waveform.

7. In power inverter apparatus as claimed in claim 4 wherein said solid-state switching elements are arranged to form at least one full bridge circuit.

8. In power inverter apparatus as claimed in claim 7 wherein said full bridge includes a first and second pair of solid-state switching devices operatively connected to the primary of said power transformer.

9. In power inverter apparatus as claimed in claim 8 including means for synchronizing the conduction of said first and second switch pair in conjunction with the alternate positive and negative half cycles of the AC waveform.

10. In power inverter apparatus as claimed in claim 4 wherein said transformer is a high-frequency transformer for producing alternate polarity picket pulses in response to triggering of said solid-state switching elements, and means operatively associated with said means for developing picket pulses for effecting inversion of selected alternate pulses and the elimination of others to develop pulse patterns of alternate polarity per half cycle of a desired AC voltage waveform.

11. In power inverter apparatus as claimed in claim 10 including synchronous demodulator circuits comprising synchronously driven, bidirectional, static double-pole, double-throw type reversing switch operatively connected to the secondary of the high-frequency transformer.

12. In power inverter apparatus as claimed in claim 11 wherein the relationship of the conduction of the solid-state switching elements and the switching operation of the synchronous demodulator circuit is such as to provide synchronous demodulator switching action at essentially 0 output voltage and essentially zero power dissipation.

13. In power inverter apparatus as claimed in claim 10 wherein said power transformer is a high-frequency power transformer operating at constant volt-seconds, the synchronous demodulator circuit switching operation providing an AC output waveform of a frequency lower than the frequency of said high-frequency transformer.

14. In power inverter apparatus as claimed in claim 1 wherein each maximum picket pulse-width is a multiple of the electrical degrees defined by each half-cycle increment, wherein the electrical degrees for each increment is represented as $w=180°/n$ wherein $n$ equals the number of half-cycle increments established by said timing pulses and $w$ equals electrical degrees per half-cycle increment, the number of $w$ elements in a full picket pulse being a function of the selected AC voltage output waveform program.

15. In power inverter apparatus as claimed in claim 1 wherein the number of half-cycle increments generated by said timing pulses is divisible by 3.

16. In power inverter apparatus as claimed in claim 1 wherein said solid-state switching devices are gates to saturation during periods of conduction.

17. In power inverter apparatus as claimed in claim 1 including picket pulse-width control means having at least one input terminal and an output terminal, said output terminal operatively connected to said means for developing picket pulses, said picket pulse-width control means uniformly adjusting the width of each of said picket pulses comprising a picket pulse pattern.

18. In power inverter apparatus as claimed in claim 17 wherein the centroids of the picket pulses forming a picket pulse pattern are maintained in a predetermined relationship, said picket pulse relationship substantially maintaining the low-order uncancelled harmonics constant with respect to the fundamental voltage content in said AC output waveform.

19. In power inverter apparatus as claimed in claim 17 wherein said picket pulse control means includes an input terminal operatively connected to the output of said switching network means, said picket pulse-width control means compensating for undesirable variation in AC output voltage by adjusting the width of said picket pulses to maintain the AC output voltage within desired limits.

20. In power inverter apparatus as claimed in claim 1 wherein said combination forms a single-phase static inverter.

21. In power inverter apparatus as claimed in claim 20 including means for operatively connecting a plurality of said single-phase static inverters to form a polyphase inverter arrangement for generating a polyphase AC output waveform, said circuit means including a phase displacement circuit means operatively connected between the means for generating timing pulses of successive single-phase static inverters in order to displace the timing pulses of successive inverters by a period equal to $360°/x$ where $x$ equals the number of single-phase static inverters.

22. In power inverter apparatus as claimed in claim 21 wherein three of said single-phase static inverters are operatively connected to form a three-phase inverter.

23. In power inverter apparatus as claimed in claim 21 wherein the number of half-cycle increments of the polyphase AC waveform is a half-cycle of the number of phases of said inverter arrangement.

24. In power inverter apparatus for converting DC voltage to an AC-voltage waveform, the combination comprising, means for generating timing pulses corresponding in number to an integral number of substantially equal increments of a period equal to the half cycle of said AC voltage waveform, switching network means being supplied from a DC voltage source and including solid-state switching elements, means for developing picket voltage pulses in response to said timing pulses, said picket pulses being of substantially uniform width, picket pulse-width control means having at least one input terminal and an output terminal, said output terminal operatively connected to said means for developing picket pulses, said picket pulse-width control means uniformly adjusting the width of each of said picket pulses comprising a picket pulse pattern, wherein said picket pulse control means includes a second input terminal, said second input terminal operatively connected to said switching network means, said picket pulse-width control means compensating for excess current flow in said switching elements by adjusting picket pulse-width to maintain an acceptable level of current flow therethrough, said picket voltage pulses triggering said solid-state switching element to provide an AC voltage waveform that is essentially devoid of selected low-order harmonics.

25. In power inverter apparatus as claimed in claim 9 wherein said picket pulse-width control means includes a third input terminal, said third input terminal operatively connected to the DC voltage source electrically connected to said switching network means, said pulse-width control means compensating for undesirable variations in said DC voltage by adjusting the width of said picket pulses.